April 11, 1939.  F. MacCALLUM  2,154,312
DRY BATTERY
Filed July 8, 1936
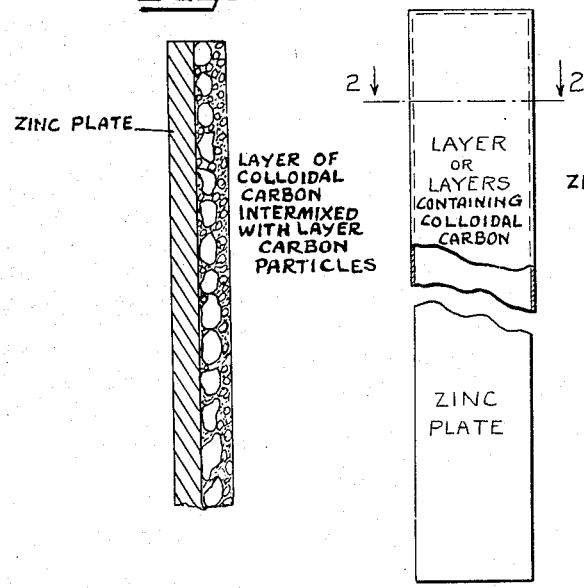
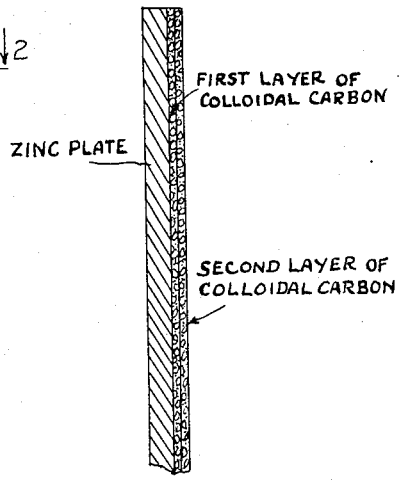
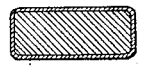
FRANK MACCALLUM
INVENTOR Patented Apr. 11, 1939

2,154,312

UNITED STATES PATENT OFFICE 2,154,312

DRY BATTERY

Frank MacCallum, Birmingham, England, assignor to Maxolite Holdings Limited, London, England Application July 8, 1936, Serial No. 89,524
In Great Britain August 25, 1934

12 Claims. (Cl. 136—127)

This invention relates to dry batteries or to single cells and particularly concerns batteries or cells of the kind in which the or each cell comprises a pair of electrodes, one of zinc and the other of carbon or carbonaceous material, these electrodes being separated by an electrolyte and depolariser, the cells or cell elements being arranged sandwichwise.

In batteries or cells of this kind carbon zinc elements are used in which the carbon is in the form of a carbonaceous layer on one side surface of a zinc plate. In multi-cell batteries this carbonaceous layer forms one electrode of one cell of the battery, whilst the zinc plate forms one electrode of an adjacent cell, but in single cells the carbonaceous layer forms the carbon electrode of the cell and the zinc plate is only a conducting support for the carbonaceous layer.

My experiments have shown that to obtain the best results where superposed elements are used (1) there should be intimate attachment between the carbon layer and the zinc plate, (2) the carbon shall contact with the plate over the entire surface of any desired area of the latter without possibility of lack of contact or poor contact at any part of the layer.

Good adhesive properties are accordingly required in the layer to be applied to the plate, but if a large proportion of adhesive is embodied in the carrier for the carbon layer, the conductivity is generally decreased and the efficient operation of the cell consequently reduced.

In addition, it is desirable that there should be good conductivity throughout the thickness of the carbon layer, and if more than one coating of particles is added, it is desirable that there should be good contact between the several coatings to ensure the desired conductivity throughout the thickness of the layer.

Further, it is desirable that the exposed surface of the carbon layer should be highly carbonaceous to promote good contact and conductivity between this surface and the remainder of the cell.

Further, a necessary requirement is that the carbon layer shall be liquid-proof throughout to prevent the possibility of pentration of liquids to the surface of the zinc plate causing undesirable local action. The carbon particles and the carrier therefore are preferably non-hygroscopic.

The primary object of the present invention is to provide a generally improved dry battery construction by means of a special carbon zinc element, and a particular object is to ensure that in such a construction the carbon particles shall adhere to the zinc plate over the entire surface of any desired area of the latter, whilst at the same time the carbon layer shall have the desired conductivity uniformly throughout its area and thickness.

These and other objects are accomplished by the combination and arrengement of elements described in the following specification, set forth in the appended claims, and illustratively exemplified in the accompanying drawing, in which:

Fig. 1 is an elevation of a single carbon electrode supported on and entirely enclosing a zinc carrier;

Fig. 2 is a sectional view of this electrode taken on line 2—2 of Fig. 1;

Fig. 3 is a longitudinal section of a bi-polar carbon zinc electrode according to one embodiment of the invention, and Fig. 4 is a similar sectional view of a bi-polar carbon zinc electrode according to another embodiment of the invention.

According to one aspect of this invention, the carbon element or layer comprises a colloidal dispersion of a pure carbon in an ammonia-resisting adhesive carrier or varnish, the element or layer becoming liquid-proof on drying.

By the expression "pure carbon" I mean a carbon black which is free from all impurities such as would materially increase its electrical resistance.

By "colloidal" I mean that the carbon is in a state of very fine sub-division approximating to the colloidal form.

Alternatively, according to the invention, the carbon element or layer comprises a colloidal dispersion of acetylene soot with a suitable binding or adhesive material, said acetylene soot being carbon black produced by incomplete combustion, as for example, in the process of producing calcium carbide.

According to a still further alternative, the carbon element or layer comprises a colloidal dispersion of graphite in an adhesive carrier or varnish, the element or layer becoming liquid-proof on drying.

The method of constructing the carbon zinc element forms no part of the present invention but is covered in application No. 139,201 filed April 27, 1937, which is a division of the present application.

A carbon zinc element according to the invention is constructed as set out in the following example:

24 grammes of acetylene soot are mixed in a colloid mill with a mixture of 7 ounces of ammonia-resisting varnish and 3 ounces of xylol spirit. (If colloidal graphite is used, a slightly less amount than 24 grammes is used.) The mixing is continued until the carbon particles become individually enclosed in the carrier or varnish, and each particle of the dry material is thereby separated by a coating of varnish.

It is advisable to mix the materials in a colloid mill because this has the effect of fining down the particles to the requisite degree, exposing it to the carrier or liquid, and finally obtaining as nearly as possible a complete suspension which is workable for painting, spraying or rolling.

One form of acetylene carbon black known as "Shawinigan Black" is obtained as a by-product in the manufacture of calcium carbide when limestone or similar material is passed over a coke furnace, the carbon black collecting in the flue. This carbon black has a specific gravity of approximately 1.89. This figure is the absolute specific gravity of the black when all air spaces are excluded.

A further suitable carbon, known as colloidal graphite, is produced by subjecting commercial graphite to a purifying treatment at a very high temperature, for example, in an electric furnace, the impurities being driven off and the graphite being obtained finally in a purified and finely divided state. This colloidal graphite has a density between 2.2 and 2.24, and when subjected to a pressure of about 150 pounds per square inch, its electrical resistance is approximately 0.02 ohm per cubic inch.

For the carrier or adhesive it is desirable to use a gum, a natural or artificial resin, varnish or other fluid, which combination of gum, resin, varnish or other fluid must essentially resist the action of ammonia and other chemicals of the battery whilst still having the necessary adhesive property when applied.

I have found that one suitable material for use as a carrier or adhesive consists of a mixture of seven parts of ammonia-resisting varnish 1294/6, specific gravity 0.895 to 0.905 with three parts xylol spirit, obtainable from Arthur Holden & Sons Limited, of Birmingham, England.

The resultant product is a colloidal dispersion of the carbon in the carrier or varnish and is applied to the surface of the zinc plate by brushing, spraying, rolling or extruding either in a single coating or layer (see Fig. 1) or in two or more thin coats or layers (see Fig. 4).

The coating or layer is allowed or caused to dry, and the resultant contraction of the carrier or varnish causes the carbon particles to penetrate the coating and draws them into effective contact in a manner which results in a layer or coating having an extremely good electrical conductivity.

In a modified form of the invention, in making the carbon zinc element, I may use the colloidal dispersion of carbon black in an adhesive or carrier as hereinbefore described in combination with carbon in the form of carbon or graphite particles (see Fig. 3).

The element may then be made in any manner hereinbefore described, and on the outer surface of the carbon element I then sprinkle small particles of graphite. This will increase the area of carbon which will slow down polarisation by reason of its greater area in contact with the depoloriser, and will assist depolarisation.

The carbon may also be dispersed in a carrier having insufficient adhesive properties and a suitable adhesive may be added to the carbon and carrier dispersion.

I believe (though this theory forms no part of the invention) that the carbon particles, although in such a fine state of division are of angular or crystalline form, and that when the coating of carrier or varnish contracts, the angles or corners of the particles penetrate their individual coatings, and the particles are moved into electrical contact.

Preferably the coating is contracted by natural drying without direct application of heat since the contraction then takes place naturally, and the resultant coating is more flexible and less liable to crack in use, whilst the danger of subjecting the coating to too high a temperature is avoided.

One object of applying the carbon and carrier to the zinc in a plurality of thin coats, as shown in Fig. 4, is to obtain a better or more even distribution of carbon through the thickness of the coat then could otherwise be obtained. If the fluid is loaded too heavily with carbon so as to ensure the pressure of carbon completely through the thickness of the coating, then it is found that under certain conditions the carbon coating is liable to crack and further, to lift from the zinc.

If more than one coating is applied, each is allowed or caused to dry prior to the application of the next or a further coating.

By using two or more thin coatings, (1) the presence of carbon throughout the thickness of the coating is assured, (2) a suitable carbonaceous surface is obtained on both faces or such portion thereof as it may be found necessary to use for the proper development of the electro-chemical action; (3) even conductivity throughout is obtained, while (4) the possibility of the formation of a film of binding material on the surface is considerably reduced, and (5) the risk of a non-liquid-proof coating is avoided.

According to a further modification of the present invention, the surface of the zinc plate may be prepared for receiving the coating of carbon either by subjecting it to a degreasing process or by sandblasting it. As an alternative, I may spray, brush or roll on to the plate a weak solution of the carbon and a gum containing or consisting of methylated spirit and lac, the solvent in the carrier not affecting the lac varnish sufficiently rapidly to render the latter unstable during the application of the second coat.

Carbon zinc elements constructed in accordance with the present invention enable the construction of cells or batteries having the following properties:

(1) Low internal resistance.
(2) Evenness of polarisation.
(3) Due to the plurality of superimposed coats of carbon and carrier, small danger of liquid penetration.
(4) Saving of space and material and other advantages consequent on the use of thin coats of carbon and carrier.
(5) Toughness in the coating of carbon and carrier.
(6) Sufficient flexibility in the coating to avoid cracking or lifting, and to accommodate distortions of plate.
(7) Sufficient mechanical strength in the coating to withstand handling or use.
(8) A suitable surface for attachment to the depolariser.
(9) Danger of deterioration is substantially eliminated, permitting the elements to be produced in the slack season and stored without reduction in efficiency.

What I claim then is:

1. A carbon zinc battery electrode, comprising a zinc plate, and a thin carbonaceous liquid-proof layer adhering to said plate, said layer forming an electrode on said plate and including a colloidal dispersion of pure carbon in an ammonia-resisting adhesive carrier.

2. A carbon zinc battery electrode, comprising a zinc plate, and a thin carbonaceous liquid-proof layer adhering to said plate, said layer forming an electrode on said plate and including a colloidal dispersion of acetylene soot in an ammonia-resisting adhesive carrier.

3. A carbon zinc battery element, comprising a zinc plate forming one electrode, and a thin carbonaceous liquid-proof layer adhering to one side of said plate, said layer forming a further electrode electrically associated with said first-mentioned electrode and including a dispersion of colloidal graphite in an ammonia-resisting adhesive carrier.

4. A carbon zinc battery element, comprising a zinc plate forming one electrode, and a thin carbonaceous liquid-proof layer adhering to one side of said plate and forming a further electrode, said layer including a colloidal dispersion of pure carbon together with carbon particles of larger size in an ammonia-resisting adhesive carrier.

5. A carbon zinc battery element, comprising a zinc plate forming one electrode, a surface coating on one side of said plate, said coating comprising a relatively small body of carbon in an adhesive varnish, and a thin carbonaceous liquid-proof layer adhering to said surface coating, said layer forming a further electrode electrically associated with said first mentioned electrode and including a colloidal dispersion of pure carbon in an ammonia-resisting adhesive carrier.

6. A carbon zinc battery electrode, comprising a zinc plate, a thin carbonaceous liquid-proof layer adhering to said plate, said layer including a colloidal dispersion of pure carbon together with carbon particles of larger size in an ammonia-resisting adhesive carrier.

7. A carbon zinc battery element, comprising a zinc plate forming one electrode and a plurality of thin coatings of carbonaceous material applied to one side surface of said plate, and constituting a carbonaceous liquid-proof layer, said layer forming a further electrode electrically associated with said first mentioned electrode and including a colloidal dispersion of pure carbon in an ammonia-resisting adhesive carrier.

8. A carbon zinc battery electrode, comprising a zinc plate, and a plurality of thin coatings of carbonaceous material applied to one side surface of said plate to form a carbonaceous liquid-proof layer, said layer forming an electrode on said plate and including a colloidal dispersion of acetylene soot in an ammonia-resisting adhesive carrier.

9. A dry battery including a carbon zinc element, the carbon forming one electrode of one cell and the zinc forming one electrode of an adjacent cell, said carbon zinc element comprising a zinc plate and a thin carbonaceous liquid-proof layer adhering to said plate, said layer including a colloidal dispersion of pure carbon in an ammonia-resisting adhesive carrier.

10. A dry battery including a carbon zinc element, the carbon forming one electrode of one cell and the zinc forming one electrode of an adjacent cell, said carbon zinc element comprising a zinc plate and a thin carbonaceous liquid-proof layer adhering to said plate, said layer including a colloidal dispersion of acetylene soot as in an ammonia-resisting adhesive carrier.

11. A dry battery including a carbon zinc element, comprising a zinc plate forming one electrode of one of the cells of said dry battery and a plurality of thin coatings of carbonaceous material applied one upon another to one side surface of said plate to form a carbonaceous liquid-proof layer, said layer forming one electrode of a further cell of said dry battery and including a colloidal dispersion of acetlyene soot in an ammonia-resisting adhesive carrier.

12. A dry battery including a carbon zinc element, comprising a zinc plate forming one electrode of one of the cells of said dry battery, and a plurality of thin coatings of carbonaceous material applied one upon another to one side surface of said plate to form a carbonaceous liquid-proof layer, said layer forming one electrode of a further cell of said dry battery and including a colloidal dispersion of pure carbon together with carbon particles of larger size in an ammonia-resisting adhesive carrier.

FRANK MacCALLUM.